United States Patent [19]

Rice et al.

[11] Patent Number: 4,819,703

[45] Date of Patent: Apr. 11, 1989

[54] BLADE MOUNT FOR PLANAR HEAD

[75] Inventors: Verle L. Rice, Harrisonville; Richard A. Keener, Garden City, both of Mo.

[73] Assignee: Verle L. Rice, Harrisonville, Mo.

[21] Appl. No.: 197,668

[22] Filed: May 23, 1988

[51] Int. Cl.⁴ .............................................. B27G 13/00
[52] U.S. Cl. ............................. 144/230; 144/117 R; 407/41; 407/49
[58] Field of Search ........... 144/117 R, 117 A, 117 B, 144/117 C, 131, 218, 225, 230, 241; 407/41, 49, 108

[56] References Cited

U.S. PATENT DOCUMENTS

| 2,836,206 | 5/1958 | Gaskell | 144/230 |
| 3,039,503 | 6/1962 | Mainone | 144/230 |
| 3,214,106 | 10/1965 | Gorman | 144/230 |

*Primary Examiner*—W. Donald Bray
*Attorney, Agent, or Firm*—Kokjer, Kircher, Bradley, Wharton, Bowman & Johnson

[57] ABSTRACT

An improved planing head for a wood planar is the subject of the present invention. A cylindrical planing head has a plurality of slots which receive the cutting blades and gib means for holding the blades in place during the planing operation. The slots and gibs are designed so that the blade sits on the bottom of the slot and tightening of the gib forces the blade down against the slot bottom. This assures that the blade will always remain in proper alignment. It is preferable to employ jack screws in the bottom of the slot so as to provide means for adjusting the blade height as needed. In either case, the only requirement for realigning a blade when an old blade is taken out and a new blade is put in is to be sure that the bottom of the blade sits on the bottom of the slot where it will be in the exact same position as the previous blade.

2 Claims, 1 Drawing Sheet

BLADE MOUNT FOR PLANAR HEAD

This invention relates generally to wood planars and, more particularly, to an improved cutting head design for a wood planar.

Wood planars have long been utilized by woodworkers for cutting wood to a desired thickness. A typical construction for a wood planar of the prior art is shown and described in U.S. Pat. No. 4,394,878, issued July 26, 1983. This patent is specifically incorporated herein by reference.

A typical planing head of the prior art includes a shaft coupled with a prime mover, a cylinder rigid with the shaft of a larger diameter than that of the shaft with multiple blades positioned around the perimeter of the cylinder. The planing blades are received within slots formed in the cylinder and are held in the slots by gibs which are secured with set screws. When it is necessary to change a blade utilizing the prior art constructions, the screws are removed along with the gib and a new blade is inserted. The gib is then repositioned in the slot and the set screws tightened. Tightening of the set screws invariably results in movement of the blade which requires time consuming precise effort to realign the blade. This is particularly bothersome if it is necessary to change blades in the middle of a job where exact uniformity is required.

It is, therefore, a primary object of the present invention to provide an improved planing head which provides for a quicker blade change than prior art constructions by greatly simplifying the blade alignment procedure.

Another important aim of the invention is to provide a planing head wherein more accurate blade alignment than with prior art constructions can be achieved in less time.

It is also an aim of our invention to provide a planing head wherein blades may be changed and the degree of reproducibility of the blade alignment between the old and new blades is greatly increased.

Another object of our invention is to provide a planing head wherein means is provided for blade alignment which does not always require complicated gauges or measuring devices that have heretofore been utilized, is also more accurate, and quicker.

An important object of this invention is to provide a planing head which meets the aims and objects set forth above and still results in a secure construction.

Other objects of the invention will be made clear or become apparent from the following description and claims when read in light of the accompanying drawing wherein:

Figure 1:
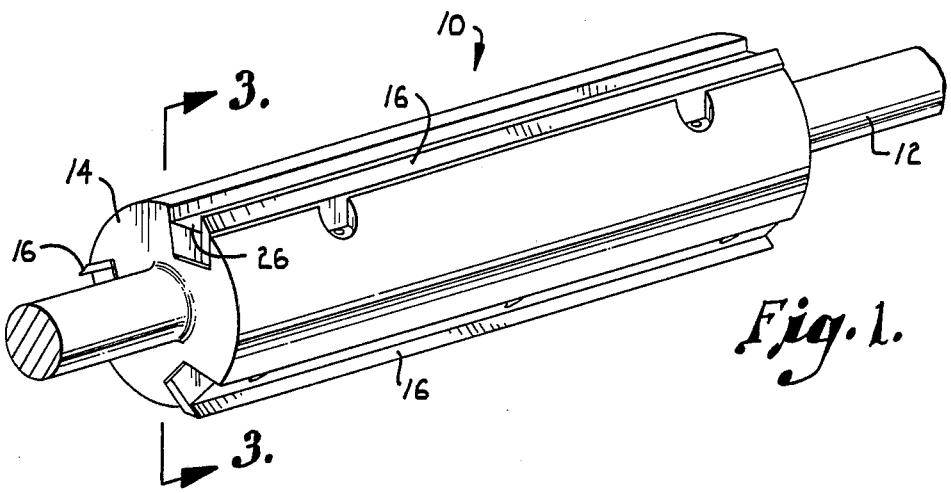
FIG. 1 is a perspective view of a planing head according to the present invention.
Figure 2:
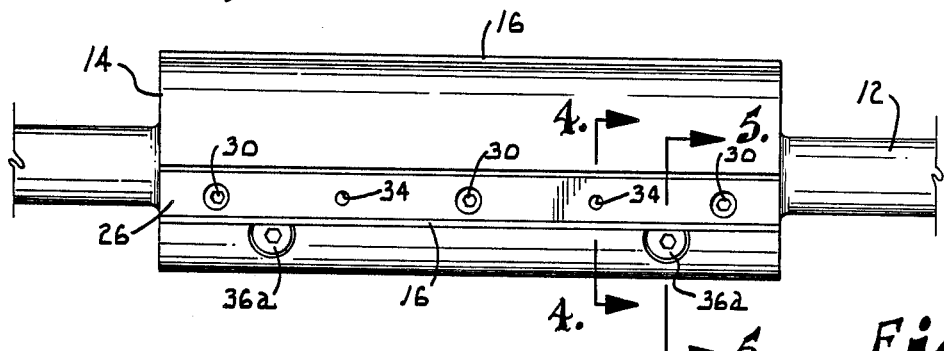
FIG. 2 is a side elevational view of the planing head shown in FIG. 1.

Referring initially to FIG. 1, the planing head according to the present invention is designated generally by the numeral 10 and includes a shaft 12, a cylinder 14 and a plurality of blades 16.

The cylinder 14 is integral with shaft 12, the latter being coupled with a prime mover (not shown) for rotation at relatively high RPMs. The cylinder is provided with a plurality of slots 18 each of which has a flat bottom 20, a first sidewall 22 which extends generally perpendicular to bottom 20, and a second sidewall 24 which is angled toward sidewall 22 as it approaches bottom 20. Manifestly, this results in walls 22 and 24 being closer together at the bottom of slot 18 than they are at the top.

Figure 3:
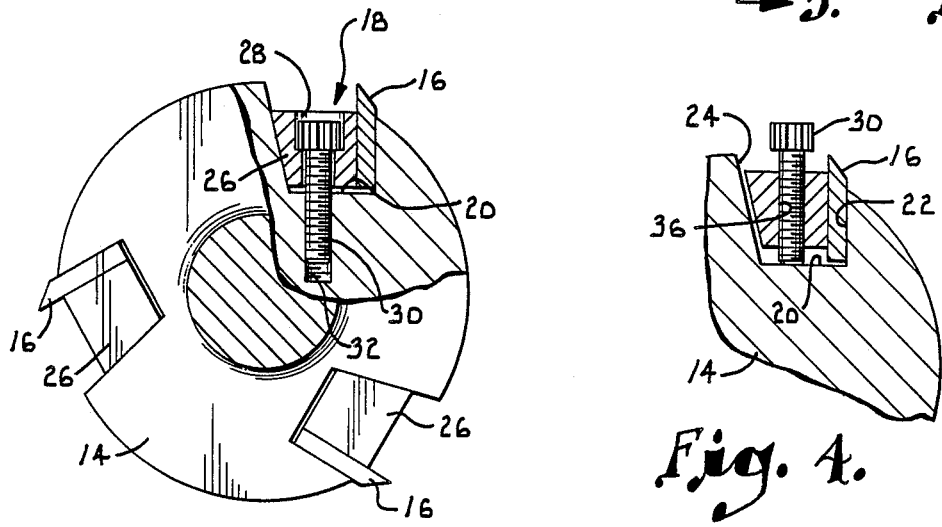
FIG. 3 is a vertical cross-sectional view taken along line 3—3 of FIG. 1.

Each blade 16 is held in its corresponding slot by a gib 26 which has a configuration generally corresponding to that of slot 18. Gib 26 is provided with a plurality of first openings 28 which receive a plurality of threaded set screws 30 in the manner illustrated in FIG. 3. Cylinder 14 is provided with a plurality of threaded openings 32 which, when gib 26 is in place of slot 18, align with the openings 28 in the gib. Gib 26 also includes a plurality of threaded openings 34 which are not aligned with cylinder openings 32 but do provide a through opening to slot bottom 20.

Figure 5:
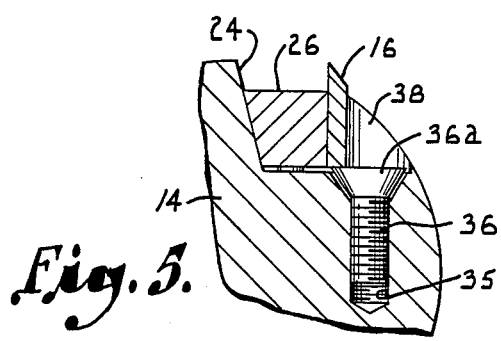
FIG. 5 is a fragmentary vertical cross-sectional view taken along line 5—5 of FIG. 2.

Two additional threaded openings 35 are provided in cylinder 14 and receive jack screws 36 as illustrated in FIG. 5. Each jack screw 36 has an enlarged head 36a which extends into the bottom of slot 18 to form a support for blade 16. A cutaway portion 38 of cylinder 14 extends above the threaded opening 34 so as to provide open access to screw head 36a.

Figure 4:
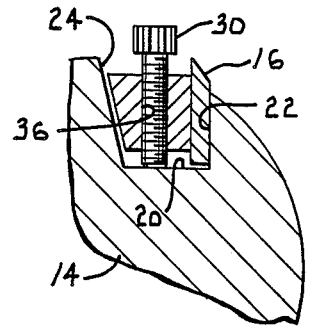
FIG. 4 is a fragmentary vertical cross-sectional view taken along line 4—4 of FIG. 2.

In operation, when it is desired to change a blade 16, first screws 30 are unscrewed sufficiently to disengage them from their openings 32 and in most cases screws 30 will be completely removed from openings 28 as well. If the screws 30 are removed completely, these same screws may then be utilized in openings 34 as illustrated in FIG. 4. The screws in openings 34 are then tightened until they engage bottom 20 and are rotated further thus exerting an upward force on gib 26 to dislodge it from the bottom of slot 18. Once gib 26 is loosened, it can be removed from the slot and old blade 16 can likewise be removed.

A new blade 16 is placed in the slot along sidewall 22 with the bottom of the blade resting on the heads of jack screws 36. Gib 26 is then reinserted into the slot and screws 30 are passed through openings 28 and threaded into openings 32 thereby tightening the gib against blade 16. Since blade 16 is being forced downwardly against screw heads 36a, it will not be forced out of alignment during the gib tightening procedure. This is to be contrasted with prior art constructions where tightening of the gib was accomplished by screws exerting a force at an angle of approximately 90° to the gib which force was then translated partially upwardly causing the blade to move out of alignment. With the present invention so long as blade 16 remains seated on jack screws 36, it will remain in perfect alignment and the reproducibility of the alignment is not subject to human error. Whenever a different blade height is needed, jack screws 36 are rotated so as to effectively move the bottom support for the blade.

From the foregoing, it will be appreciated that a greatly improved planing head has been provided which meets the objectives heretofore set forth. Various modifications in the invention may be made without departing from the scope thereof, which is intended to be limited only by the appended claims.

We claim:
1. A planing head comprising:
a shaft adapted to be coupled with a prime mover;

a cylinder rigid with said shaft and having a slot in its surface extending parallel to the axis of the cylinder, said slot having a flat bottom and first and second sidewalls extending upwardly from said bottom, said sidewalls being closer together at said bottom than at the cylinder surface, a plurality of threaded openings being present in said bottom;

blade means disposed in said slot along said first sidewall and having a cutting edge projectig from said cylinder; and gib means having a configuration generally corresponding to the configuration of said slot and provided with a plurality of openings and screws therein aligned with the threaded openings in said slot bottom, whereby when said gib means is placed in said slot along with said blade and said screws are tightened, said blade is firmly held in said slot, said gib means further including a plurality of threaded through openings spaced from said first mentioned openings whereby when screws are threaded through said second mentioned openings they engage the bottom of said slot and said gib means is forced upwardly.

2. A planing head as set forth in claim 1, wherein is included a plurality of jack screws threadably received by said cylinder and having heads which extend into said bottom adjacent said first sidewall whereby said blade will seat on said jack screws when it is placed in said slot along side said first sidewall, said cylinder having an opening extending upwardly from said head.

* * * * *